3,535,312
NOVEL 22-AMINO-23,24-BISNORCHOLANE
DERIVATIVES
Rainer Philippson, Hochstrasse 63, Bergkamen-Mitte,
Germany; Helmut Haüser, Neuenstrasse 10, Dortmund,
Germany; Emanuel Kaspar, Ostkamp 18, Kamen, Germany; and Mahmud Muftic, P.O. Box 33, Geneva,
Switzerland
No Drawing. Filed Feb. 7, 1968, Ser. No. 703,564
Claims priority, application Germany, Feb. 7, 1967,
Sch 40,180; Jan. 9, 1968, Sch 41,816
Int. Cl. C07c 173/10
U.S. Cl. 260—239.5  28 Claims

ABSTRACT OF THE DISCLOSURE

Novel 22-amino-23,24-bisnorcholane derivatives and the method of preparing them are provided by the invention.

The invention relates to novel 22-amino-23-24-bisnorcholane derivatives of the general formula

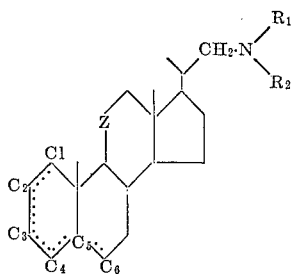

and salts thereof, wherein $R_1$ and $R_2$ individually may be hydrogen, acyl, alkyl, aryl, aralkyl, or a heterocyclic radical, or jointly may form a ring system whose carbon chain may be interrupted by further hetero atoms, Z is $=CH_2$, $=CH(OH)$ or CO, and $$C_1\text{---}C_2,\ C_2\text{---}C_3,\ C_3\text{---}C_4,\ C_4\text{---}C_5,\ \text{and}\ C_5\text{---}C_6$$

are saturated or unsaturated carbon-to-carbon bonds. If several double bonds are present, they are not to be cumulated, however, and if $C_4$–$C_5$–$C_6$ represents saturated carbon-to-carbon bonds and one of $$C_1\text{---}C_2\ \text{or}\ C_2\text{---}C_3$$

represents an unsaturated carbon-to-carbon bond, the hydrogen atom in position 5 may have an α- or a β-configuration; and if the ring A and B is saturated, the hydrogen atom in position 5 is in α-position.

Moreover, the invention relates to a method for preparing the compounds defined above characterized, in a conventional manner, in that (a) a carbonyl oxygen of the amide group of compounds of the formula

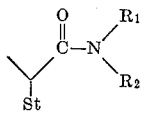

is hydrogenated to a $CH_2$ group, $R_1$ and $R_2$ being as defined above, and St being the aforedefined steroid skeleton, whereupon the amino group in position 22 may be alkylated if so desired, provided $R_1$ and/or $R_2$ is hydrogen; or (b) compounds of the formula

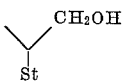

wherein St represents the aforedefined steroid skeleton are esterified in position 22 with a sulfonic acid and the 22-ester so obtained is reacted with the desired base; or (c) compounds of the formula

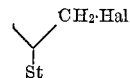

wherein Hal is halogen and preferably iodine or bromine, and St is the aforedefined steroid skeleton, are reacted with the ultimately desired base; or (d) in 22-azido compounds of the formula

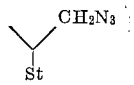

wherein St represents the abovedefined steroid skeleton the azido group is hydrogenated to a 22-amino group, and the 22-amino group may be subsequently alkylated, if so desired; or (e) in compounds of the formula

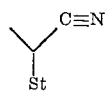

wherein St is the aforedefined steroid skeleton the cyano group is reduced to the $—CH_2—NH_2$ group, and the 22-amino group may be subsequently alkylated, if desired; or (f) in compounds of the formula

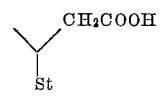

wherein St is the aforedefined steroid skeleton, the carboxyl group is decomposed in a known manner to form the amine having one carbon atom less, and the 22-amino group so obtained is alkylated if so desired; or (g) in compounds having the ultimately desired side chain which have an oxygen-bearing functional group in position 3, such as a keto group or a free or esterified hydroxyl group, the oxygen-bearing functional group in position 3 is split off with simultaneous formation of a double bond in the nucleus, such as in positions 2, 3 or 3, 5; or (h) for preparing compounds saturated in rings A and B the double bonds of a primary product are hydrogenated in a conventional manner according to method (g), whereupon the base obtained by any of the methods (a) to (h) may be converted to the salt if so desired, by suitable means.

Acyl radicals to be considered include the radicals of such acids which are known to be suitable for acylating an amino group. Radicals of aliphatic carboxylic acids having 1 to 12 carbon atoms in the acyl radical are preferred, such as formic acid, acetic acid, proprionic acid, enanthic acid, caproic acid, undecylic acid, etc. Obviously, the acidss may also be unsaturated, branched, polybasic or substituted in the usual manner. The following may be mentioned as examples: trimethylacetic acid, t-butylacetic acid, phenylacetic acid, cyclopentylpropionic acid, haloacetic acids, aminoacetic acid, oxypropionic acid, benzoic acid, succinic acid, adipic acid, etc.

Suitable alkyl radicals are preferably saturated or unsaturated, straight-chained or branched-chained lower alkyl, such as methyl, ethyl, butyl, isopropyl, tert-butyl, vinyl, ethinyl, etc.

Among aryl and aralkyl radicals the phenyl, benzyl, and phenethyl radicals are preferred.

Examples of suitable heterocyclic radicals include thiazolyl, pyrimidyl, pyridinyl, pyranyl, furanyl, thiophenyl, 1,3,4-thiadiazolyl.

If $R_1$ and $R_2$ jointly are elements of a heterocyclic ring system, which may also be substituted and/or interrupted by additional hetero atoms, the following preferred examples of radicals may be mentioned: piperidino, pyrrolidino, morpholino, piperazino, thiomorpholino, imidazolino and the like.

The radicals $R_1$ and $R_2$ may additionally be substituted in the usual manner. Suitable substituents include especially alkyl, alkoxy, hydroxyl, acyloxy, nitro, keto, free or esterified carboxyl, free or substituted amino, and halogen.

The carbonyl oxygen atoms of the amide group is hydrogenated by the methods and hydrogenation agents which are shown to those skilled in the art for the hydrogenation of acid amides to the corresponding amines. Preferred hydrogenating agents are particularly lithium aluminum hydride, aluminum alkyl compounds such as diisobutyl aluminum hydride, and like complex metal hydrides. The starting material is reacted in a suitable inert solvent such as tetrahydrofuran, dioxane, ether, benzene, and the like, with the hydrogenation agent, preferably at elevated tmeperature, and if desired, with the exclusion of atmospheric oxygen. A preferred protective atmosphere consists of nitrogen or argon.

The N-alkylation which may be desired after formation of the amine is also carried out according to known alkylation methods, preferably using the corresponding monohalo- or dihaloalkyls.

If the compounds of the invention are to be prepared according to method (b) above set forth, the primary 22-sulfonic acid radical, preferably a 22-mesyl or 22-tosyl radical, is replaced by the ultimately desired amino group by methods which are also known in themselves. The replacement is preferably carried out in such a manner that the corresponding 22-mesyl or 22-tosyl radical is reacted at preferably elevated temperature in a suitable solvent, such as benzene, with the desired base which may also serve as a solvent. In some cases, it may be preferred to convert the 22-sulfonic acid ester first to the corresponding 22-haloderivative, preferably the iodine or bromine deriative, such as by means of alkali metal halide, such as sodium iodide, in an anhydrous solvent, and ultimately to react the haloderivative with the desired base. It is possible to prepare in this manner those products of the method in which $R_1$ and/or $R_2$ represent a heterocylic radical, for example, by reacting the 22-iododerivative in a known manner, for example, with aminothiazole, aminopyridine, aminopyrimidine, aminothiophen, aminopyran, aminofuran.

If the products of the invention are prepared according to method (d), the 22-azido radical is also hydrogenated according to the methods and with the hydrogenating agents which are known to those skilled in the art for the hydrogenation of azides to the corresponding amines. Preferred suitable hydrogenation agents include particularly lithium aluminum hydride. The azido compound employed as a starting material (which may be prepared, for example, from the sulfonic acid ester obtained according to method (b) by reaction with lithium azide) is reacted in a suitable inert solvent, such as ether, tetrahydrofuran, dioxane, benzene, preferably at elevated temperatre, and in the absence of atmospheric oxygen, if so desired, with the hydrogenating agent which is also dissolved or suspended in an inert solvent.

The hydrogenation of the cyano group in position 22 to the $CH_2NH_2$ group is also carried out according to methods which are familiar to those skilled in the art for hydrogenating nitriles. All hydrogenation agents which permit a selective hydrogenation of the cyano group are suitable, for example, lithium aluminum hydride. The starting material is reacted in a suitable inert solvent, such as tetrahydrofuran or ether, with the hydrogenating agent at preferably elevated temperature, and in a protective atmosphere, for example, of nitrogen or argon, if so desired.

When the compounds of the invention are prepared according to method (f), the 23-carboxyl group is decomposed to the 22-amine according to methods which are familiar to those skilled in the art in the conversion of acids to amines having one fewer carbon atom. The decomposition reaction is preferably carried out by converting the acid by way of the acyl chloride with a suitable azide, such as an alkali metal azide, into the acyl azide, and by rearranging the latter at preferably elevated temperature in a polar solvent such as acetic acid.

When the compounds of the invention are to be prepared according to method (g), the ultimately desired side chain in position 17 is already present in the starting material. The starting materials, however, have an oxygen-bearing functional group in position 3, such as a keto or hydroxyl group. The functional group is eliminated according to known methods. A 3-keto or 3-hydroxyl group is eliminated by conversion to the 3-tosyl or 3-mesyl ester. When these esters are treated with organic bases, preferably in a warm system, the 3-tosyloxy or 3-mesyloxy radical is split off with simultaneous formation of a double bond in the nucleus. This double bond is then preferably saturated method (h) by means of hydrogen in the presence of a metal catalyst. Preferred suitable catalysts are platinum and platinum compounds, such as $Pto_2$, or Pd-catalysts, the catalysts being optionally precipitated on carrier materials in the usual manner. The hydrogenation is carried out in solvents, such as are commonly used for hydrogenation reactions, preferably alcohols or ethyl acetate.

If the free base primarily formed is to be converted to the salts, the salts are also formed according to the methods known for this purpose. The base is preferably dissolved in an organic solvent, such as diethyl ether, diisopropyl ether, or tetrahydrofuran, or mixtures thereof, and is treated with the ultimately desired acid, for example, by passing hydrogen chloride gas.

The compounds of the invention are therapeutically valuable active agents against pathogenic microorganisms. As compared to known substances having antimicrobial effects, such as fucidin and nystatin, the compounds of the invention are distinguished by their broader spectrum of effectiveness. They act not only, like fucidin, or staphylococcus strains, such as *S. pyrogenes aureus* or Mycoplasma strains, such as *M. gallisepticum*, but also against Dermatophytes such as *Trychophyton mentagrophytes*, *Epidermatophyton floccosum*, and *Microsporum gypseum*, against trichomonads, such as *Trichomonas vaginalis* and *Trichomonas foetus*, against protozoa, such as *Entameba histolytica*, against mould fungus, mycobacteria, and against strains of Candida, such as *C. albicans*.

Such active agents having a wide spectrum of effectiveness are of particular interest for the medical practice because they are suitable for combating mixed functions.

The outstanding fungicidal effect is illustrated by comparison of 22 - (N-pideridyl)-$\Delta^3$-5$\beta$-bisnorcholene hydrochloride (II) as compared to the known nystatin (I), the concentration listed being the dosage at which total inhibition of growth occurs in vitro (plate test).

| Compound Number | Compound | Candida albicans (ATCC 10231) Concentration /ml. |
|---|---|---|
| I | Nystatin | 10 |
| II | 22-(N-piperidyl)-$\Delta^3$-5$\beta$-bisnorcholene hydrochloride. | <5 |
| III | 22-amino-$\Delta^3$-5$\beta$-bisnor-cholene hydrochloride. | <10 |
| IV | 22-amino-$\Delta^{3,5}$-cnbisnorcholadiene hydrochloride. | <10 |
| V | 22-N-methylamino-$\Delta^3$-5$\beta$-bisnorcholene hydrochloride. | <5 |

The compounds of the invention may be applied for medicinal use according to the intended purpose either externally, for example, in ointments, orally, for example in tablets, coated tablets, powders or capsules, or parenterally as injectable compositions.

The therapeutic compositions containing the compounds of the invention are prepared in the usually known manner by compounding the active agent with addition agents, carriers, taste improving agents and the like as is conventional in galenic pharmacy, and by converting the mixture ultimately into the desired application form.

If the active agents are to be employed in the form of their salts, the free base primarily obtained is converted to the desired salt in the usual manner known in itself. Suitable salts include the hydrochlorides, sulfates, gluconates, citrates, and also salts with organic acids such as acetic acid, succinic acid, benzoic acid or salicylic acid.

Within the scope of the instant invention, the term "salts" shall also include the quaternary ammonium salts. They are also obtained in a conventional manner by reacting the corresponding free base with an alkyl halide preferably at elevated temperatures in the presence of alcohol as a solvent.

The following examples are further illustrative of, but not restricted to, the method of the invention.

EXAMPLE 1

350 mg. $\Delta^3$-5$\beta$-bisnorcholene-22-carboxylic acid (M.P. 198–201° C.) prepared from the methyl ester of 5$\beta$-bisnorcholane-3$\alpha$-ol-22-carboxylic acid by dehydration and saponification of the methyl ester of $\Delta^3$-5$\beta$-bisnorcholene-22-carboxylic acid are dissolved in 7 ml. benzene, mixed with 0.07 ml. thionyl chloride and 0.001 ml. pyridine, and the mixture is stirred for one hour at room temperature. The clear reaction solution is then evaporated to dryness in a vacuum. The crude $\Delta^3$-5$\beta$-bisnorcholene-22-carboxyl chloride is dissolved in 14 ml. tetrahydrofuran and is stirred into an aqueous solution of ammonium hydroxide cooled with ice. The mixture is then diluted with ice water and the precipitated $\Delta^3$-5$\beta$-bisnorcholene-22-carboxamide is filtered off with suction, washed, dried, and recrystallized from hexane. There are obtained 280 mg. M.P. 156–159° C.

270 mg. $\Delta^3$-5$\beta$-bisnorcholene-22-carboxamide are dissolved in 40 ml. tetrahydrofuran and are added drop by drop with agitation to a slurry of 560 mg. lithium aluminum hydride in 30 ml. tetrahydrofuran. The mixture is left to react for 48 hours at 60° C. It is then permitted to cool and the excess of lithium aluminum hydride is decomposed with acetone. 80 ml. water are added, the precipitate is filtered off with suction, washed well with methylene chloride and the organic phase is recovered. The aqueous phase is shaken repeatedly with methylene chloride, the washings are combined with the organic phase, washed dried, and evaporated to dryness.

210 mg. 22-amino-$\Delta^3$-5$\beta$-bisnorcholene are obtained. Dry hydrogen chloride gas is passed with agitation and ice cooling into a solution of this amine in ether. The precipitated 22-amino-$\Delta^3$-5$\beta$-bisnorcholene hydrochloride is filtered off with suction and dried. There are obtained 190 mg. M.P. 265–270° C. (decomp.).

EXAMPLE 2

The $\Delta^3$ - 5$\beta$ - bisnorcholene-22-carboxylic chloride obtained in a manner analogous to Example 1 from $\Delta^3$-5$\beta$-bisnorcholene-22-carboxylic acid is dissolved in 6 ml. benzene and added to a solution of 0.23 ml. piperidine in 3 ml. benzene. The reaction solution obtained is left to stand for one hour at 50° C. It is then permitted to cool to room temperature and stirred into ice water. The benzene phase is recovered, washed with water, 2-N HCl, and water, dried over sodium sulfate, and evaporated to dryness in a vacuum. The residue is filtered over the tenfold amount of silica gel. There are obtained 350 mg. $\Delta^3$-5$\beta$-bisnorcholene-22-carboxyl piperidide which are dissolved in 8 ml. tetrahydrofuran and added drop by drop to a slurry of 175 mg. lithium aluminum hydride in 8 ml. tetrahydrofuran. This mixture is permitted to react for 20 hours at 50° C. and is thereafter worked up in a manner analogous to Example 1, and the 22-(N-piperidyl)-$\Delta^3$-5$\beta$-bisnorcholene is also converted to the hydrochloride by analogy with Example 1. 270 mg. of M.P. 315–318° C. (decomp.) are obtained.

EXAMPLE 3

22 - hydroxy - $\Delta^{3,5}$-bisnorcholadiene is prepared from $\Delta^4$-bisnorcholene-3-one-22-al by hydrogenation of the formyl group with sodium borohydride at —20° C, followed by hydrogenation of the 3-keto group with lithium aluminum hydride to 3,22-dihydroxy-$\Delta^4$-bisnorcholene which is then heated in acetone in the presence of p-toluenesulfonic acid. A solution of 10 g. 22-hydroxy-$\Delta^{3,5}$-bisnorcholadiene in 200 ml. absolute pyridine is gradually mixed with 10 g. toluenesulfochloride with ice cooling. The solution is left to stand overnight at room temperature and is then stirred into 1.5 liters ice water. The precipitate formed is extracted with chloroform several times and the combined chloroform solutions are washed, in sequence, with water, dilute sulfuric acid, and sodium bicarbonate solution. After drying over sodium sulfate and evaporation of the solvent, 12.0 g. 22-tosyloxy-$\Delta^{3,5}$-bisnorcholadiene are obtained and are converted to the 22-azide by dissolving in one liter methanol and 300 ml. isopropyl ether, and by refluxing of the solution for 5 hours with 200 ml. of a lithium azide solution prepared from 8.5 g. lithium chloride dissolved in 200 ml. anhydrous methanol and refluxed for 5 hours with 15 g. pulverized sodium azide, whereupon the mixture was left to stand overnight with refrigeration, and was filtered. The solvent is evaporated from the 22-azide solution in a vacuum, and the residue is distributed between water and ether. The ether solution is recovered, the solvent is evaporated in a vacuum, and 10 g. of a colorless oil are obtained as a residue having a strong band in the IR spectrum at 2120/cm., but no more $\gamma$-SO$_2$ bands. The oil is dissolved in 300 ml. absolute ether and is added drop by drop to a slurry of 1.5 g. lithium aluminum hydride in 200 ml. abs. ether with stirring under a reflux condenser. After 5 hours of heating with reflux, 20 ml. water are added dropwise, and thereafter 150 ml. 10% sodium hydroxide solution in a stream. The ether layer is separated, and the aqueous layer is repeatedly extracted with ether. The combined ether solutions are dried over sodium sulfate, and the solvent is evaporated in a vacuum. The residue is dried in a high vacuum and dissolved in absolute ether, whereupon hydrogen chloride gas is introduced into the solution. The precipitated hydrochloride is filtered off with suction, stirred with ethyl acetate, and dried in a vacuum at 100° C. 6 grams of colorless crystals are obtained and do not melt below 300° C.

EXAMPLE 4

(a) 4.5 g. 22 - (N-piperidyl)-$\Delta^4$-bisnorcholene-3-one are dissolved in 300 ml. ether and added dropwise to a slurry of 0.8 g. lithium aluminum hydride in 200 ml. abs. ether with stirring under a reflux condenser. After 5 hours' heating with reflux, 10 ml. water are slowly added drop by drop and thereafter 150 ml. 10% sodium hydroxide solution are added quickly in a stream. The ether layer is separated, and the aqueous layer is repeatedly extracted with ether. The combined ether solutions are dried with sodium sulfate, and the solvent is evaporated in a vacuum. 4.3 grams of colorless crystals are obtained, which are immediately converted to 22-(N-piperidyl)-$\Delta^{3,5}$-bisnorcholadiene hydrochloride.

(b) 4.3 g. 22-(N-piperidyl)-$\Delta^4$-bisnorcholene-3-ol are dissolved in 500 ml. abs. acetone and refluxed for one hour with 3.2 g. p-toluenesulfonic acid. This mixture is then neutralized with a solution of sodium carbonate, and the acetone is driven off in a vacuum. The residue is diluted with water and extracted with ether. The ether solution is dried with sodium sulfate, and is evaporated to dryness in a vacuum. The residue is recrystallized from methanol-ether. There are obtained 2.8 g. of colorless crystals of melting point 151–153° C. which are converted to the hydrochloride by means of an ether solution of hydrogen chloride.

(c) 4 g. 22-(N-piperidyl)-Δ⁴-bisnorcholene-3-ol are refluxed for 24 hours in about 200 ml. acetic anhydride. The acetic anhydride is then distilled off in a vacuum, and the almost dry residue is recrystallized from methanol containing a little pyridine, 3 g., 2-(N-piperidyl)-Δ³,⁵-bisnorcholadiene are thus obtained, and are converted to the hydrochloride by means of an ether solution of hydrogen chloride.

EXAMPLE 5

1.5 g. Δ⁴-bisnorcholene-3,11-dione-22-carboxypiperidine (M.P. 241–243° C., prepared from Δ⁴-bisnorcholene-3,11-dione-22-carboxylic acid) are dissolved in 80 ml. tetrahydrofuran, added to a suspension of 0.4 g. lithium aluminum hyoride in 20 ml. tetrahydrofuran, and refluxed for 16 hours with stirring. The mixture is then permitted to cool, and the excess of lithium aluminum hydride is decomposed with acetone. 35 ml. water are added, the preciptate formed is filtered off with suction, washed with methylene chloride, the filtrate is treated or dissolved with methylene chloride, the methylene chloride solutions are combined, washed with water, dried, and partly evaporated in a vacuum. 1.5 g. 22-(N-piperidyl)-Δ⁴-bisnorcholene-3,1β-diol are obtained, and are dissolved in 170 ml. acetone jointly with 1.2 g. p-toluenesulfonic acid and refluxed for one hour. The mixture is then neutralized with sodium carbonate solution, the acetone is distilled off in a vacuum, water is added, and the mixture is extracted with ether. The ether solution is washed with water, dried and evaporated. 0.65 g. 22 - (N - piperidyl)-Δ³,⁵-bisnorcholadiene-11β-ol is recovered from the residue by preparative thin layer chromatography and recrystallization from isopropanol. M.P. 152–153.5° C. UV: $\epsilon_{228}$=19600; $\epsilon_{234}$=20900.

The hydrochloride is precipitated with hydrogen chloride from the ether solution of the base. M.P. 307–309° C. (decomp.).

EXAMPLE 6

2 g. 5β - bisnorcholane - 3α - ol-3-tosylate-22-carboxypiperidine (M.P. 159–160° C., prepared from 5β-bisnorcholane - 3α-ol-22-carboxypiperidine and p-toluenesulfochloride) are refluxed for three hours in 20 ml. freshly distilled collidine. After cooling, the reaction mixture is stirred into ice water, acidified with hydrochloric acid, and extracted with chloroform. The chloroform solution thereafter is washed with water, dried over sodium sulfate, and evaporated to dryness in a vacuum. The residue is dissolved in benzene and filtered over the tenfold amount of silica gel, and the residue then obtained from the benzene solution is recrystallized from hexane. There are obtained 1.1 g. Δ³-5β-bisnorcholene-22-carboxypiperidine of melting point 112.5–113.5° C., which is then hydrogenated with lithium aluminum hydride by the method of Example 1. The isolated crude product yields 0.85 g. 22-(N-piperidyl)-Δ³-5β-bisnorcholene after recrystallization from acetone. M.P. 154–156° C.

EXAMPLE 7

0.60 g. 20-cyano-5β-pregnane-3α-ol-3-tosylate (M.P. 152.5–153°C., prepared from 5β-bisnorcholane-3α-ol-22-carboxamide and p-toluenesulfochloride in pyridine) is treated with collidine as in Example 6 and worked up. After recrystallization from isopropylether, 0.285 g. 20-cyano-Δ³-5β-pregnene of melting point 120.5–121.5° C. is obtained, and is hydrogenated to 22-amino-Δ³-5β-bisnorcholene with lithium aluminum hydride by the method of Example 1. The hydrochloride is obtained by treating the amine with hydrogen in ether. M.P. 265–270° C. (decomp.).

EXAMPLE 8

20 g. Δ⁴-bisnorcholene-22-ol-3-one are dissolved in 600 ml. abs. tetrahydrofuran and added dropwise to a suspension of 3.5 g. lithium aluminum hydride in 100 ml. abs. tetrahydrofuran. The mixture is hydrolyzed after 3 hours with aqueous tetrahydrofuran, and mixed with 10% hydrochloric acid. The solvent is evaporated in a vacuum, and the residual suspension is extracted with ether. The Δ³,⁵-bisnorcholadiene-22-ol so obtained as a colorless oil is dissolved in pyridine, and mixed with 20 g. p-toluenesulfochloride. The mixture is poured into ice water after standing for about 16 hours, and extracted with chlorofoam. 16.5 g. 22-tosyloxy-Δ³,⁵-bisnorcholadiene of M.P. 149–152° C. are isolated from the extract, and are refluxed with 200 ml. of 1-N methanol solution of lithium azide for 5 hours. The solvent is evaporated in a vacuum, the residue is distributed between ether and water and the ether layer is separated. After evaporation of the solvent, there are obtained 11 g. 22-azido-Δ³,⁵-bisnorcholadiene as a colorless oil which is dissolved in 200 ml. abs. ether and added drop by drop to a slurry of 1.5 g. lithium aluminum hydride in 200 ml. abs. ether. The mixture is refluxed for 3 hours, hydrolyzed by means of aqueous ether, and mixed with 10% sodium hydroxide solution. The ether layer is separated, and the aqueous layer is repeatedly extracted with ether. Hydrogen chloride gas is introduced into the dried ether solution. 7.0 g. 22-amino-Δ³,⁵-bisnorcholadiene hydrochloride are obtained M.P. over 300° C. (decomp.) UV: $\epsilon_{235}$=17100.

EXAMPLE 9

2.6 g. 3β-hydroxy-5α-bisnorcholanic acid methyl ester (obtained from the free acid by means of diazomethane) are dissolved in dry pyridine and mixed with 3 g. toluenesulfochloride. After standing for about two days at 5° C. the reaction mixture is stirred into ice water and extracted with chloroform. 3.0 g. 3β-tosyloxy-5α-bisncholenic acid methyl ester of M.P. 143–145° C. are isolated from the chloroform solution, and refluxed with 30 ml. freshly distilled collidine under a nitrogen atmosphere. The reaction mixture is added to cold dilute hydrochloric acid and extracted with chloroform. The chloroform extract is evaporated to dryness in a vacuum, the residue is taken up in benzene and filtered over 50 g. silica gel. The benzene is evaporated in a vacuum. There are obtained 2.1 g. Δ²-5α-bisnorcholenic acid methyl ester of M.P. 110–112° C. which are hydrogenated with 400 mg. lithium aluminum hydride is abs. ether by three hours' refluxing. The mixture is hydrolyzed and mixed with 10% sodium hydroxide solution. After extraction, there is obtained 1.5 g. Δ²-5α-bisnorcholene-22-ol, M.P. 137–138° C., which is immediately converted by means of 2 g. p-toluenesulfochloride in 50 ml. dry pyridine into the 22-tosyloxy-Δ²-5α-bisnorcholene which is obtained as a colorless oil (thin layer chromatogram in cyclohexane-ethyl acetate 7:3 is uniform). When heated for five hours with 60 ml. of a 1-N solution of lithium azide in methanol, the compound yields 22-azido-Δ²-5α-bisnorcholene with lithium aluminum hydride, and the conversion into the hydrochloride is carried out as in Example 8. 750 mg. 22-amino-Δ²-5α-bisnorcholene hydrochloride are obtained. M.P. over 300° C. (decomp.).

EXAMPLE 10

4.1 g. 5α-bisnorcholane-3β-ol-3β-acetate-22-carboxylchloride are converted by means of piperidine to 5α-bisnorcholane-3β-ol-3β-acetate-22-carboxypiperidine by analogy with Example 2. The oily material (4.3 g.) is dissolved in abs. ether and added dropwise to a suspension of 3 g. lithium aluminum hydride in abs. ether. After refluxing for three hours, the mixture is hydrolyzed and worked up with 10% sodium hydroxide. Extraction with ether yields 3.5 g. of a mixture of substances which is separated into two components by means of preparative thin layer chromatography in cyclohexanediethylamine: 1.4 g. 22-(N-piperidino)-5α-bisnorcholane-3β-ol-3β-acetate and 2.1 g. of the corresponding free alcohol which is converted to 22-(N - piperidino) - 5α - bisnorcholane-3β-ol-3β-tosylate by means of p-toluenesulfochloride. The Δ²-compound is obtained by refluxing with collidine in a manner analogous to Example 9. 1.38 g. of a crude material are obtained. From this, 600 mg. 22-(N-piperidino)-Δ²-5α-bisnorcholene of M.P. 142-144° C. are isolated after twice recrystallizing from methanol. The compound is converted to the hydrochloride by means of hydrogen chloride in ether. M.P. over 300° C. (decomp.).

EXAMPLE 11

The Δ³-5β-bisnorcholene-22-carboxylchloride obtained by a method analogous to Example 1 from 1 g. Δ³-5N-bisnorcholene-22-carboxylic acid is dissolved in tetrahydrofuran and stirred into an aqueous methylamine solution cooled by means of ice. The mixture is then diluted with ice water and the precipitated Δ³-5β-bisnorcholene-22-carboxymethylamide is filtered off with suction, washed, dried, and recrystallized from ethyl acetate. There are obtained 520 mg. Δ³-5β-bisnorcholene-22-carboxymethylamide of M.P. 172.5–174° C.

450 mg. Δ³-5β-bisnorcholene-22-carboxymethylamide are hydrogenated in the manner of Example 1 with lithium aluminum hydride in tetrahydrofuran, and worked up. The crude 22-N-methylamino-Δ³-5β-bisnorcholene so obtained is dissolved in dry ether, and dry hydrogen chloride is introduced into the ice cooled solution. The precipitated 22-N-methylamino-Δ³-5β-bisnorcholene hydrochloride is filtered off with suction and dried. Yield 310 mg. M.P. 284–286° C. (decomp.).

EXAMPLE 12

200 mg. 22-amino-Δ³-5β-bisnorcholene are dissolved in 5 ml. ethanol and 166 mg. 1,5-dibromopentane and 140 mg. anhydrous sodium carbonate are added. The reaction mixture is refluxed 16 hours with stirring. It is permitted to cool, and 20 ml. ethanol are added, whereupon the inorganic precipitate is filtered off. The filtrate is evaporated to dryness, and the residue obtained is taken up in ether. The insoluble material is filtered off, and the ether solution is evaporated to dryness. The residual crude 22-(N-piperidyl)-Δ³-5β-bisnorcholene is recrystallized from acetone. Yield 120 mg.; M.P. 154–156° C.

EXAMPLE 13

5 g. Δ³-5β-norcholenic acid chloride (prepared from methyl norlithocholate by tosylation, heating in collidine, saponification with alcoholic potassium hydroxide, and reaction with thionyl chloride) is dissolved in 100 ml. acetone and cooled to 10° C. A solution of 2 g. sodium azide in 7 ml. water is added dropwise at this temperature. Ice water is added after 15 minutes to form a precipitate which is filtered off. The filter cake, while still moist, is added to a mixture of 100 ml. glacial acetic acid and 10 ml. water. The mixture is then heated to 60–70° C. for three hours, and is subsequently subjected to steam distillation. The free amine is obtained by adding sodium hydroxide and is extracted with ether. The 22-amino-Δ³-5β-bisnorcholene hydrochloride (3.5 g.) is obtained therefrom by means of hydrogen chloride in ether, and has the melting point reported in Example 1.

EXAMPLE 14

2.48 g. lithium aluminum hydride are dissolved in 100 ml. ethylene glycol dimethyl ester (Diglyme), and cooled to 0° C.; 18 ml. boron trifluoride etherate dissolved in 40 ml. Diglyme are added dropwise over a period of 30 minutes, and the mixture is stirred thereof for 3 hours. Thereafter, a solution of 2 g. 22-(N-piperidyl)-Δ⁴-bisnorcholene-3-one in 50 ml. Diglyme is added dropwise, and stirring is continued for one-half hour at 0° C. After an additional hour at room temperature, 50 ml. acetic anhydride are added, and the mixture is refluxed for one hour. After cooling, it is washed first with water, and then with sodium carbonate until alkaline. It is extracted with ether, the extract is dried over sodium sulfate, and 22 - (N - piperidyl)-Δ³-5α-bisnorcholenehydrochloride of M.P. 300° C. is precipitated with hydrogen chloride.

EXAMPLE 15

50 g. lithium aluminum hydride are dissolved in 1.3 liter Diglyme, and 320 ml. boron trifluoride etherate in 1 liter Diglyme are added dropwise over 2½ hours. After an additional hour at 0° C., a solution of Δ⁴-bisnorcholene-22-ol-3-one in Diglyme is added. 1 liter acetic anhydride is added to the mixture after one hour at room temperature, and the composition so obtained is refluxed for one hour. It is then added to water and extracted with ether. The 22-acetate so obtained (35 g.) is dissolved in 20% ethanol and is refluxed for one hour with 20 g. KOH. The solvent is then evaporated in a vacuum, and the residue is distributed between water and ether. After drying and evaporation of the ether phase, 28 g. Δ³-5α-bisnorcholene-22-ol of M.P. 126–128° C. are obtained (from hexane). By analogy with Example 3, Δ³–5α-bisnorcholene-22-amine hydrochloride is obtained from Δ³–5α-bisnorcholene-22-ol by way of the 22-tosylate and 22-azide. Yield 16 g. of M.P. >300° C.

EXAMPLE 16

2 g. 22-(N-piperidyl)-Δ⁴-bisnocholene-3-one are dissolved in 70 ml. absolute ether and added dropwise to a solution of 2 g. LiAlH₄ in 75 ml. ether. After refluxing for 15 minutes, the mixture is cooled with ice, and 2.2 g. AlCl₃, dissolved in ether, are slowly added. The mixture so obtained is refluxed for 30 minutes and cooled, and the excess of reagent is destroyed with ethyl acetate. The mixture is then made alkaline with 20% KOH solution, and subsequently extracted with ether. The crude material (1.84 g.) is purified by means of preparative thin layer chromatography in cyclohexanediethylamine 9:1. There is obtained 0.74 g. 22-(N-piperidyl)-Δ⁴-bisnorcholene hydrochloride of M.P. >300° C.

EXAMPLE 17

20 g. 22-tosyloxy-Δ³,⁵-bisnorcholadiene are dissolved in one liter ethanol and are refluxed for four hours with 200 ml. 40% aqueous dimethylamine solution. During this period, additional 1000 ml. of dimethylamine solution are added dropwise. The mixture thereafter is refluxed for one hour longer. After standing overnight in the refrigerator, the amine is filtered off with suction (6.4 g.) and is converted by means of hydrochloric acid in ether to N,N-dimethyl-Δ³,⁵-bisnorcholadiene-22-amine hydrochloride (6.0 g.). M.P. >300° C.

EXAMPLE 18

When 5 g. 22-tosyloxy-Δ³-5α-bisnorcholene are reacted in a manner analogous to Example 17 with dimethylamine, there are obtained 2.4 g. N,N-dimethyl-Δ³-5α-bisnorchlorene - 22 - amine hydrochloride. M.P. >300° C.

EXAMPLE 19

50 g. 23,24-dinor-3,4-choladiene-22-ol (prepared from 23,24-dinor-4-cholene-3-one-22-ol by hydrogenation with lithium aluminum hydride and subsequent work-up in an acid medium) are exhaustively hydrogenated by means of 5 g. PtO₂ in glacial acetic acid. The catalyst is then removed by filtration, and the solvent is evaporated in a vacuum. The residue is recrystallized from isopropyl ether, and there are obtained 45 g. 23,24-dinor-5α-cholane-22-ol of M.P. 163–164° C., which is dissolved in anhydrous pyridine and mixed with 25 g. p-toluenesulfochloride while being cooled with ice. The reaction mixture is left to stand at room temperature for 16–20 hours, and is then poured into ice water and extracted with chloroform. 60 g. 23,24-dinor-5α-cholane-22-ol-22-p-toluenesulfonate of M.P. 159–161° C. (from methanol) are recovered from the chloroform extract. The tosylate is dissolved in 3 liters 1-N methanolic lithium azide solution and refluxed 5 hours. The solvent thereafter is evaporated in a vacuum, the residue is distributed between water and ether, and the ether phase is washed until neutral and dried. Evaporation of the ether leaves 40 g. 22-azido- 23,24-dinor-5α-cholane as a colorless oil whose IR spectrum shows the bands characteristic of azido at 2110 cm.$^{-1}$. The azido compound is ultimately hydrogenated with 10 g. lithium aluminum hydride in abs. ether, the excess LiAlH$_4$ is decomposed with sodium hydroxide, the ether solution is separated, washed until neutral and dried, whereupon the ether is evaporated. A colorless oil of 28 g. 23,24-dinor-5α-cholane-22-amine is obtained and is reacted with hydrochloric acid in ether. The melting point of the recovered, dry hydrochloride is above 300° C. The chlorine value found by analysis agrees with the calculated value. Calculated: 9.69%; found 9.96%.

EXAMPLE 20

A solution of 10 g. 23,24-dinor-5α-cholane-22-ol-22-p-toluenesulfonate, 500 ml. ethanol, and 100 ml. 40% dimethylamine solution is refluxed. An additional amount of 500 ml. diethylamine solution is added dropwise to the boiling reaction mixture within 4 hours. The solution is then cooled to room temperature, left to stand for about 18 hours, and evaporated almost to dryness, whereupon the residue is distributed between water and ether. Hydrogen chloride is introduced into the washed and neutral, dried ether solution until the same is saturated with HCl, the precipitated hydrochloride is recovered and dried. There are obtained 5.3 g. N,N-dimethyl-23,24-dinor-5α-cholane-22-amine hydrochloride. M.P. above 300° C. Chlorine analysis: calculated 9.28, found 9.24.

When the ether solution is worked up directly, without introducing hydrogen chloride, by evaporating the ether to dryness, there are obtained about 4.5 g. N,N-dimethyl-23,24-dinor-5α-cholane-22-amine as colorless oil.

EXAMPLE 21

10 g. 23,24-dinor-5α-cholane-22-ol-22-p-toluenesulfonate are reacted with 33% methylamine solution as in Example 20. When the ether solution obtained by work-up of the reaction mixture is washed until neutral and dried, and the ether is evaporated, 22-piperidino-23,24-dinor-5α-cholane-22-methylamine is obtained. When hydrogen chloride is introduced into the dry ether solution, 7.7 g. N-methyl-23,24-dinor-5α-cholane-22-amine hydrochloride having an M.P. above 300° C. are obtained. Chlorine analysis: calculated 9.63; found 9.69.

EXAMPLE 22

5 g. 23,24-dinor-3,5-choladiene-22-piperidine are exhaustively hydrogenated with 500 mg. 10% Pd/C in ethyl acetate. The catalyst is filtered off, and the solution is evaporated in a vacuum. The residue is recrystallized from isopropyl ether. There are obtained 4 g. 22-piperidino-23,24-dinor-5α-cholane of M.P. 155–157° C. The hydrochloride is obtained from the amine by treatment with hydrochloric acid in ether.

EXAMPLE 23

2.0 g. 23,24-dinor-5α-cholane-22-amine are dissolved in ml. formic acid and 6.5 ml. acetic anhydride and are refluxed in the presence of a nitrogen atmosphere for five hours. After cooling, the reaction mixture is stirred into ice water and extracted with chloroform. The chloroform solution is washed neutral, dried with sodium sulfate, and evaportaed in a vacuum. 1.6 g. of crude N-(23,24-dinor-5α-cholane-22-yl)-formamide are obtained in this manner, which melts at 186–188° C. after having been recrystallized twice from acetone.

EXAMPLE 24

2.0 g. 23,24-dinor-5α-cholane-22-amine are refluxed in 20 ml. acetic anhydride for 8 hours. The excess of acetic anhydride is then distilled off in a vacuum, and the residue is recrystallized from methanol. There is obtained 1.1 g. N,N-diacetoxy-23,24-dinor-5α-cholane-22-amine of M.P. 126–127° C.

EXAMPLE 25

In the manner of Example 22, 0.5 g. 22-piperidino-11β-hydroxy-23,24-dinor-3,5-choladien are hydrogenated and worked up. The crude 22-piperidino-11β-hydroxy-23,24-dinor-5α-cholane is dissolved in ether/tetrahydrofuran and is precipitated as the hydrochloride by dry hydrogen chloride led into the solution. Yield 0.3 g.; analysis: N calculated 3.23; found 3.18; Cl calculated 8.20; found 8.08.

EXAMPLE 26

1.75 g. 23,24-dinor-5α-cholane-22-amine are dissolved in absolute ether and a solution of 540 mg. maleic anhydride in absolute ether is added in a single batch. The immediately precipitating white slurry is filtered with suction and is washed repeatedly with ether. There are obtained 1.5 g. N-(23,24-dinor-5α-cholane-22-yl)-maleamic acid of M.P. 225–227° C.

EXAMPLE 27

3 g. 22-chloro-23,24-dinor-5α-cholane (obtained as a by-product in the tosylation according to Example 19) are dissolved in 50 ml. ethanol and are heated in a glass autoclave to 90° C. for 3 days with 50 ml. anhydrous trimethylamine. The reaction mixture is evaporated in a vacuum, and the residue is treated with ether. There are obtained 1.2 g. crystalline trimethyl-(23,24-dinor-5α-cholane-22-yl)-ammonium chloride. M.P. 270° C. (decomp.).

EXAMPLE 28

2 g. 22-tosyloxy-Δ$^{3,5}$-bisnorcholadiene (see Example 3) are dissolved in methylisobutylketone, and are refluxed overnight with 4 g. imidazole. The reaction mixture is evaporated to dryness in a vacuum, and the residue is distributed between water and ether. The ether phase is dried and then mixed with a hydrogen chloride solution in ether. There are obtained thereby 750 mg. Δ$^{3,5}$-bisnorcholadiene-22-imidazole hydrochloride. M.P. 215° C. (decomp.).

EXAMPLE 29

3 g. tosyloxy-Δ$^{3,5}$-bisnorcholadiene (see Example 3) are refluxed overnight with 150 ml. methylisobutylketone and 40 ml. ethanolamine, and the reaction mixture is then subject to steam distillation. The distillate is cooled and extracted with ether. After being dried and mixed with a solution of hydrogen chloride in ether, it yields 2.0 g. (Δ$^{3,5}$-bisnorcholadiene-22-yl)-2-hydroxyethylamine hydrochloride. M.P. 248° C. (decomp.).

EXAMPLE 30

5 g. tosyloxy-Δ$^{3,5}$-bisnorcholadiene are refluxed with 50 ml. allylamine and 50 ml. acetone under a nitrogen atmosphere for 8 hours. The reaction mixture is then brought to dryness in a vacuum, and the residue is taken up in an ether solution of hydrogen chloride. The precipitate of Δ$^{3,5}$-bisnorcholadiene-22-allylamine hydrochloride, which is formed thereby, is filtered off and is recrystallized from methanol. M.P. 300° C.

EXAMPLE 31

2.5 g. Δ$^{3,5}$-bisnorcholadiene-22-amine (see Example 3) is dissolved in 400 ml. benzene and refluxed with 1.2 g. dimedone and 250 mg. toluenesulfonic acid with separation of water. The aqueous phase thus separated is extracted with about 200 ml. benzene. The combined benzene solutions are washed with 5% sodium bicarbonate solution, dried with sodium sulfate, filtered, and then evaporated to dryness in a vacuum. 700 mg. of the dimedone condensation product are obtained. M.P. 227–229° C.

EXAMPLE 32

4.7 g. 22-tosyloxy-Δ$^{3,5}$-bisnorcholadiene are refluxed under a nitrogen atmosphere with 150 ml. methylisobutylketone and 15 g. piperazine for about 16 to 18 hours.

The reaction mixture is worked up in a conventional manner (for example, by analogy with Example 19). 3.2 g. $\Delta^{3,5}$-bisnorcholadiene-22-piperazine dihydrochloride are obtained. M.P. 300° C.

We claim:
1. Compounds of the formula

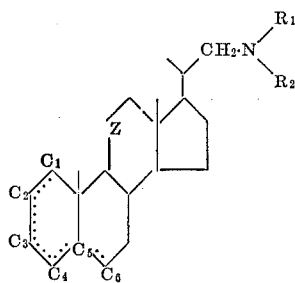

and salts thereof, wherein $R_1$ and $R_2$, taken individually, may be hydrogen, acyl having 1 to 8 carbons, alkyl having 1 to 7 carbons, aryl, alkaryl having 1 to 7 carbons in the alkyl moiety, a heterocyclic group containing 5 or 6 members in the ring, or when taken together $R_1$ and $R_2$ with the adjacent nitrogen represents a cyclic group which can contain other hetero atoms, Z is $=CH_2$, $=CH(OH)$ or $=CO$, and $C_1---C_2$, $C_2---C_3$, $C_3---C_4$, $C_4---C_5$, and $C_5---C_6$ are saturated or unsaturated carbon-to-carbon bonds, no adjacent double bonds being present if several double bonds are present; if $C_4---C_5---C_6$ are saturated carbon-to-carbon bonds, while $C_1---C_3$ or $C_2---C_3$ are unsaturated carbon-to-carbon bonds, the hydrogen atoms in position 5 may be selected from the group consisting of $\alpha$- or $\beta$-configuration; and if the ring A and B is saturated, the hydrogen atom in position 5 is in $\alpha$-position.

2. A compound as set forth in claim 1 comprising 22-amino-$\Delta^3$-5$\beta$-bisnorcholene and the hydrochloride thereof.

3. A compound as set forth in claim 1 comprising 22-(N-piperidyl)-$\Delta^3$-5$\beta$-bisnorcholene and the hydrochloride thereof.

4. A compound as set forth in claim 1 comprising 22-amino-$\Delta^{3,5}$-bisnorcholadiene and the hydrochloride thereof.

5. A compound as set forth in claim 1 comprising 22-(N-piperidyl)-$\Delta^{3,5}$-bisnorcholadiene and the hydrochloride thereof.

6. A compound as set forth in claim 1 comprising 22-(N-piperidyl)-$\Delta^{3,5}$-bisnorcholadiene-11$\beta$-ol and the hydrochloride thereof.

7. A compound as set forth in claim 1 comprising 22-amino-$\Delta^2$-5a-bisnorcholene and the hydrochloride thereof.

8. A compound as set forth in claim 1 comprising 22-(N-piperidyl)-$\Delta^2$-5a-bisnorcholene and the hydrohloride thereof.

9. A compound as set forth in claim 1 comprising 22-N-methylamino-$\Delta^3$-5$\beta$-bisnorcholene and the hydrochloride thereof.

10. A compound as set forth in claim 1 comprising 23,24-dinor-5a-cholane-22-amine and the hydrochloride thereof.

11. A compound as set forth in claim 1 comprising N,N-dimethyl-23,24-dinor-5a-cholane-22-amine and the hydrochloride thereof.

12. A compound as set forth in claim 1 comprising N-methyl-23,24-dinor-5a-cholane-22-amine and the hydrochloride thereof.

13. A compound as set forth in claim 1 comprising 22-piperidino-23,24-dinor-5a-cholane and the hydrochloride thereof.

14. A compound as set forth in claim 1 comprising N-(23,24-dinor-5a-cholane-22-yl)-formamide.

15. A compound as set forth in claim 1 comprising N,N-diacetoxy-23,24-dinor-5a-cholane-22-amine.

16. A compound as set forth in claim 1 comprising 22-(N-piperidyl)-$\Delta^3$-5a-bisnorcholene and the hydrochloride thereof.

17. A compound as set forth in claim 1 comprising 22-amino-5a-bisnorcholene and the hydrochloride thereof.

18. A compound as set forth in claim 1 comprising 22-(N-piperidyl)-$\Delta^4$-bisnorcholene and the hydrochloride thereof.

19. A compound as set forth in claim 1 comprising 22-N,N-dimethylamino-$\Delta^{3,5}$-bisnorcholadiene and the hydrochloride thereof.

20. A compound as set forth in claim 1 comprising 22-dimethylamino-$\Delta^3$-5a-bisnorcholene and the hydrochloride thereof.

21. A compound as set forth in claim 1 comprising 22-piperdino - 11$\beta$ - hydroxy - 23,24 - dinor - 5a - cholane and the hydrochloride thereof.

22. A compound as set forth in claim 1 comprising N-(23,24-dinor-5-$\alpha$-cholane-22-yl)-maleamic acid.

23. A compound as set forth in claim 1 comprising trimethyl-(23,24-dinor-5$\alpha$-cholane-22 - yl) - ammonium chloride.

24. A compound as set forth in claim 1 comprising $\Delta^{3,5}$-bis - norcholadiene - 22 - imidazole and its hydrochloride.

25. A compound as set forth in claim 1 comprising ($\Delta^{3,5}$-bisnorcholadiene-22-yl)-2 - hydroxyethylamine and its hydrochloride.

26. A compound as set forth in claim 1 comprising $\Delta^{3,5}$-bisnorcholadiene-22-allylamine and its hydrochloride.

27. A compound as set forth in claim 1 comprising $\Delta^{3,5}$-bisnorcholadiene-22-amine-dimedone.

28. A compound as set forth in claim 1 comprising $\Delta^{3,5}$-bisnorcholadiene-22-piperazine and its hydrochloride.

References Cited

UNITED STATES PATENTS 2,846,432   8/1958   Nysted.
3,272,708   9/1966   Bertin et al.

HENRY A. FRENCH, Primary Examiner

U.S. Cl. X.R.

260—397, 397.1, 397.3, 397.5, 999